US008330850B2

(12) United States Patent
Miura

(10) Patent No.: US 8,330,850 B2
(45) Date of Patent: Dec. 11, 2012

(54) APPARATUS AND METHOD FOR SHOOTING A MOVING IMAGE AND A STILL IMAGE SIMULTANEOUSLY

(75) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 12/403,307

(22) Filed: Mar. 12, 2009

(65) Prior Publication Data

US 2009/0231454 A1 Sep. 17, 2009

(30) Foreign Application Priority Data

Mar. 12, 2008 (JP) ................................. 2008-062765

(51) Int. Cl.
*H04N 5/232* (2006.01)
*H04N 5/235* (2006.01)
*G03B 13/00* (2006.01)

(52) U.S. Cl. .................. 348/346; 348/220.1; 348/221.1; 348/345

(58) Field of Classification Search ............... 348/220.1, 348/221.1, 345–356
See application file for complete search history.

(56) References Cited

U.S. PATENT DOCUMENTS

| 5,982,984 | A  | * | 11/1999 | Inuiya ........................... 386/225 |
| 6,885,406 | B2 | * | 4/2005  | Yui et al. ....................... 348/564 |
| 7,456,896 | B2 | * | 11/2008 | Nakashima et al. .......... 348/345 |
| 7,760,240 | B2 | * | 7/2010  | Won et al. ................... 348/220.1 |
| 7,796,182 | B2 | * | 9/2010  | Konishi ......................... 348/345 |
| 7,855,744 | B2 | * | 12/2010 | Kimoto ........................ 348/346 |
| 2004/0109067 | A1 | * | 6/2004  | Yokoi ........................ 348/220.1 |
| 2004/0197096 | A1 | * | 10/2004 | Hofer ........................... 396/121 |
| 2004/0263674 | A1 | * | 12/2004 | Koreki ........................... 348/345 |
| 2005/0225650 | A1 | * | 10/2005 | Hayashi et al. ............. 348/231.3 |
| 2006/0055814 | A1 | * | 3/2006  | Okawa et al. ................. 348/346 |
| 2006/0092306 | A1 | * | 5/2006  | Kim ......................... 348/333.01 |
| 2006/0215039 | A1 | * | 9/2006  | Kobayashi ................. 348/220.1 |
| 2006/0215040 | A1 | * | 9/2006  | Sugawara .................. 348/220.1 |
| 2006/0238622 | A1 | * | 10/2006 | Shimosato ................. 348/220.1 |
| 2006/0239654 | A1 | * | 10/2006 | Kawamura .................... 386/107 |
| 2006/0290932 | A1 | * | 12/2006 | Kawanami .................... 356/370 |

(Continued)

FOREIGN PATENT DOCUMENTS

JP 9-222664 8/1997

(Continued)

OTHER PUBLICATIONS

Japanese Office Action for Application No. 2008-062765 dated Jan. 24, 2012.

*Primary Examiner* — Lin Ye
*Assistant Examiner* — Chia-Wei A Chen
(74) *Attorney, Agent, or Firm* — Carter, DeLuca, Farrell & Schmidt LLP

(57) ABSTRACT

An imaging apparatus provided with a function of shooting a moving image and a still image, and capable of displaying an image to be captured on a display unit includes a first display control unit configured to display a confirmation image for checking an in-focus state on the display unit when a moving image is shot; and a second display control unit configured to change the confirmation image for checking an in-focus state displayed on the display unit by the first display control unit when a still image is shot during moving image shooting.

4 Claims, 6 Drawing Sheets

U.S. PATENT DOCUMENTS

| | | | |
|---|---|---|---|
| 2007/0009251 A1* | 1/2007 | Koskinen | 396/147 |
| 2007/0052836 A1* | 3/2007 | Yamada et al. | 348/345 |
| 2007/0071432 A1 | 3/2007 | Senba | |
| 2008/0074531 A1* | 3/2008 | Ide et al. | 348/346 |
| 2008/0112689 A1* | 5/2008 | Yokoi | 386/117 |
| 2008/0136958 A1* | 6/2008 | Nakahara | 348/345 |
| 2008/0175579 A1* | 7/2008 | Kawakami | 396/155 |

FOREIGN PATENT DOCUMENTS

| | | |
|---|---|---|
| JP | 11-308488 | 11/1999 |
| JP | 2006-109199 A | 4/2006 |
| JP | 2006-323374 A | 11/2006 |
| JP | 2007-096753 | 4/2007 |

\* cited by examiner

FIG. 2A

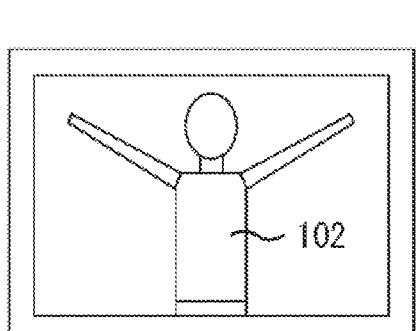

SHOOT STILL IMAGE

HALF-PRESS SHUTTER BUTTON →

FIG. 2B

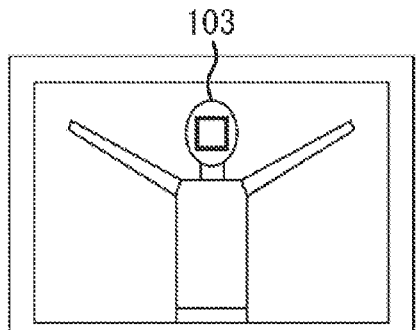

SHOOT STILL IMAGE (STILL IMAGE MODE)
DISPLAY FOCUS FRAME

FIG. 2C

← RETURN TO ORIGINAL DISPLAY STATE AFTER STILL IMAGE SHOOTING OR LAPSE OF TIME

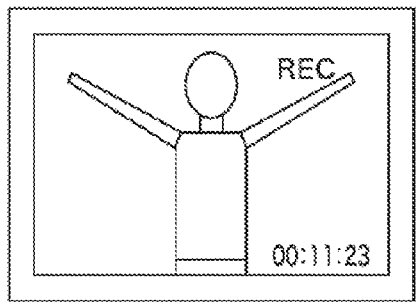

TURN PEAKING DISPLAY OFF DURING MOVING IMAGE SHOOTING

SWITCH BETWEEN AF AND MF

FIG. 2D

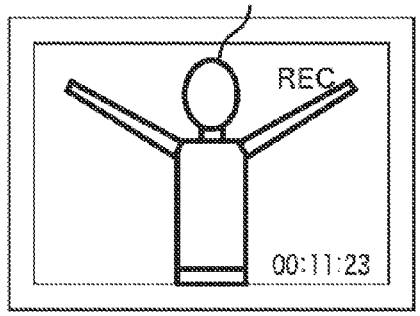

TURN PEAKING DISPLAY ON DURING MOVING IMAGE SHOOTING (ASSIST MF FOCUS)

HALF-PRESS/FULL-PRESS SHUTTER BUTTON

FIG. 2E

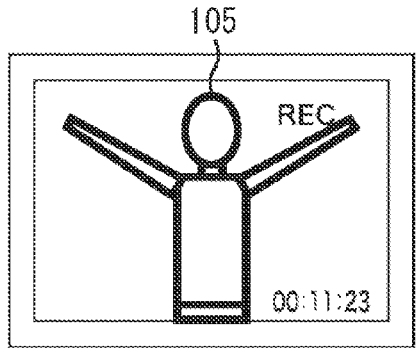

SIMULTANEOUSLY SHOOT STILL IMAGE DURING MOVING IMAGE SHOOTING
· CHANGE INTO COLOR DIFFERENT FROM DISPLAY COLOR IN FOCUS ASSIST OF MOVING IMAGE

FIG. 4A

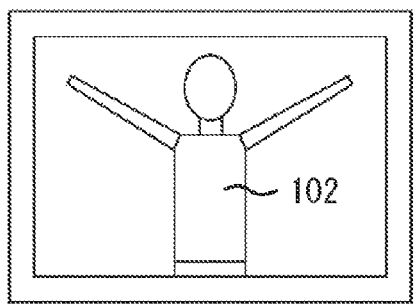

SHOOT STILL IMAGE

→ HALF-PRESS SHUTTER BUTTON →

FIG. 4B

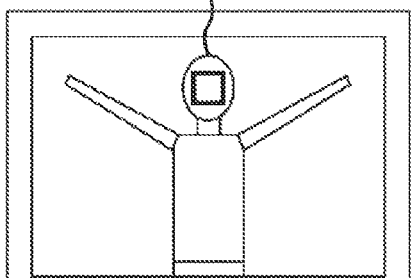

SHOOT STILL IMAGE (STILL IMAGE MODE)
DISPLAY FOCUS FRAME

← RETURN TO ORIGINAL DISPLAY STATE AFTER STILL IMAGE SHOOTING OR LAPSE OF TIME

FIG. 4C

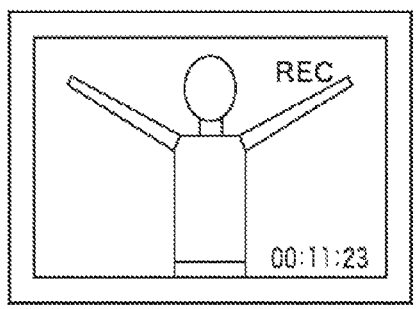

TURN PEAKING DISPLAY OFF DURING MOVING IMAGE SHOOTING

SWITCH BETWEEN AF AND MF

FIG. 4D

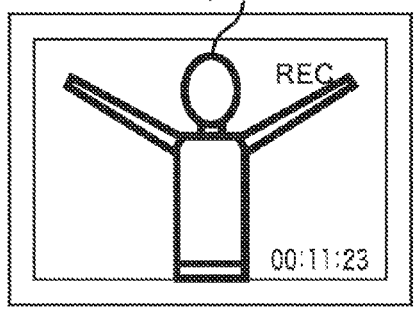

TURN PEAKING DISPLAY ON DURING MOVING IMAGE SHOOTING
(ASSIST MF FOCUS)

→ HALF-PRESS/FULL-PRESS SHUTTER BUTTON →

FIG. 4E

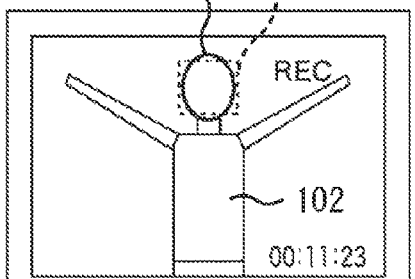

SIMULTANEOUSLY SHOOT STILL IMAGE DURING MOVING IMAGE SHOOTING
· DISPLAY PEAKING ON FOCUS AREA/DETECTED FACE PORTION
· CHANGE DISPLAY COLOR ACCORDING TO THE DEGREE OF FOCUSING
ORANGE (DEFOCUS STATE) → GREEN (IN-FOCUS STATE)

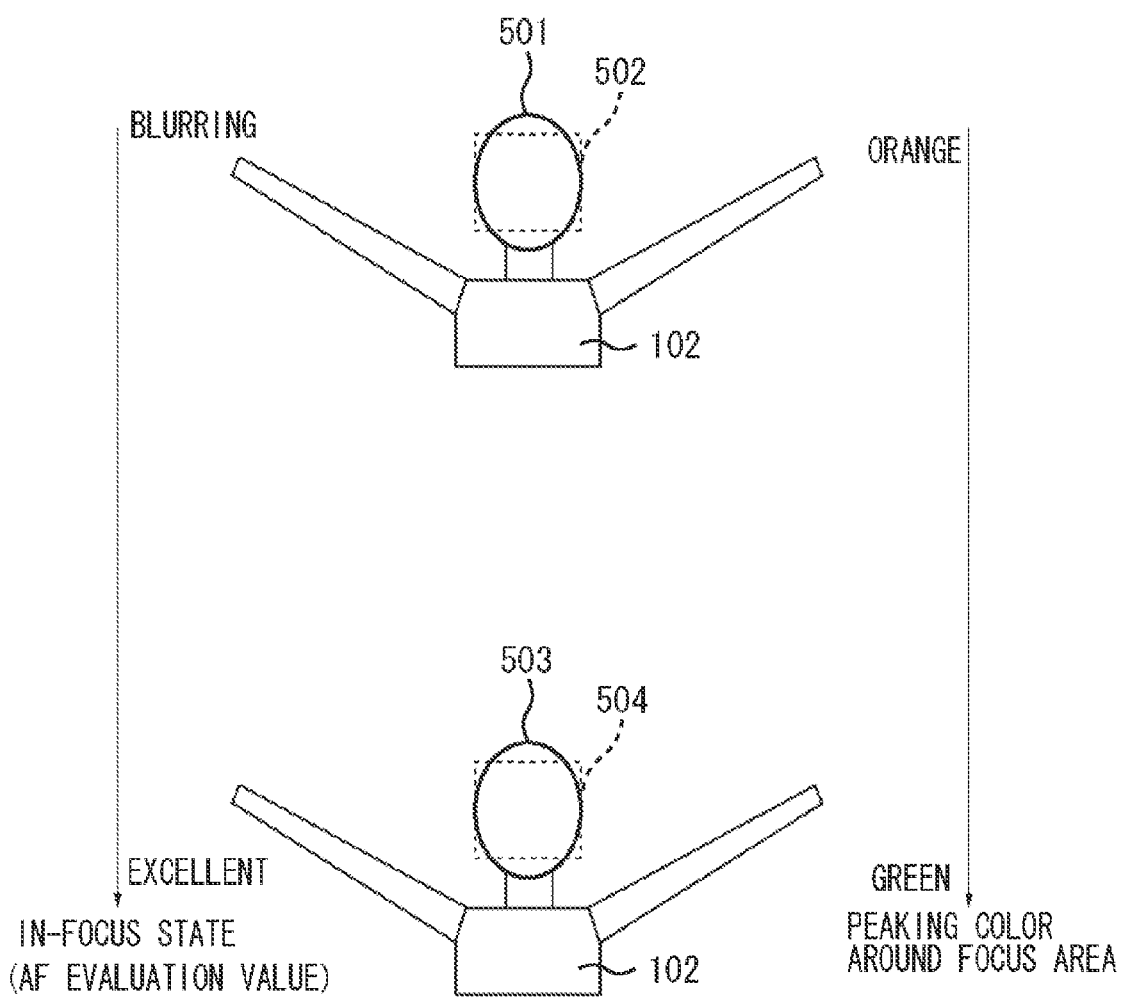

APPARATUS AND METHOD FOR SHOOTING A MOVING IMAGE AND A STILL IMAGE SIMULTANEOUSLY

BACKGROUND OF THE INVENTION

1. Field of the Invention

The present invention relates to an imaging apparatus such as a digital video camera and a digital camera, particularly, an imaging apparatus capable of showing a display effect.

2. Description of the Related Art

In a business video camera, a photographer often performs manual focus (hereinafter, referred to as MF) operation, which precisely focuses on an object within a angle of view or intentionally defocuses the object, under various shooting conditions. Further, MF is not limited to the business video camera. There are consumer digital video cameras that can not only perform autofocus (hereinafter, referred to as AF) but also can switch to the MF operation.

In order to enhance visibility such as correctness of focusing in the business imaging apparatus, a large screen image display unit can be provided or an external separate display device can be connected to the camera. Further, in a consumer imaging apparatus, to achieve miniaturization and cost reduction, a display unit such as an electronic viewfinder (EVF) for image display and a liquid crystal display panel is often small-sized. Accordingly, from the viewpoint of display resolution, visibility of a display is not sufficiently high.

Further, a consumer digital video camera in a high-definition format is increasingly used. However, when an image captured in the high-definition format (hereinafter referred to as HD image) is viewed on a large screen television, defocusing may appear more conspicuously than in a case of a conventional super density (SD) image (navigation technology system (NTS), phase alternating line (PAL) or the like).

In a business video camera and also in a consumer video camera, in order to enhance visibility of focusing in a display unit, there is a technique to assist focusing when focusing is manually performed.

The technique is referred to as, for example, "contour correction, video peaking and enhancer (hereinafter referred to as peaking)". According to the technique, a contour signal is extracted from a captured image and the contour is emphasized by executing superimposition and addition to an original image, or an edge is emphasized by applying, for example, a band pass filter to an image.

An emphasized contour is differently seen depending on a shooting object and characteristics of a display unit in each imaging apparatus, such as a display size and the number of display pixels. There is a business imaging apparatus in which a user itself can change an emphasizing level of contour and a display color with a dedicated dial or the like during shooting.

On the other hand, a digital video camera often includes not only a function of shooting a moving image but also a function of shooting a still image. There is also a camera, in which not only an image can be shot by switching between a moving image mode and a still image shooting mode but also a function of simultaneously shooting a still image during moving image shooting is provided.

Generally, in a still image shooting mode which shoots only a still image like a digital camera, a focused location is specified by displaying a focus frame on a focus area determined to be an in-focus state among a plurality of focus areas which detect in-focus states.

In contrast to this mode, in still image shooting during moving image shooting, display relating to an in-focus state of a still image such as display of a focus frame is not performed and still image shooting is performed by giving priority to a moving image shooting.

In such circumstances, with respect to peaking display, in order to improve visibility and operability, the following imaging apparatus has been proposed.

An imaging apparatus has been proposed which divides a region within an image based on a degree of focusing. A defocus state of an image in an out-of focus region is exaggerated according to a degree of focusing, and with respect to an in-focus region, for example, sharpness is emphasized. In addition, a processing mode is switched between the uniform display processing and the divided display processing in a screen (Japanese Patent Application Laid-Open No. 2007-96753).

Further, an imaging apparatus has been proposed which, when still image shooting is executed during moving image shooting, indicates in a finder that moving image shooting is in progress, after a still image is shot, in a display form different from previous one. Accordingly, a user does not forget that moving image shooting is in progress while concentrating on still image shooting (Japanese Patent Application Laid-Open No. 9-222664).

Further, an imaging apparatus has been proposed which inserts a still image into a display screen that displays a moving image during shooting, to visually indicate that a still image has been shot during moving image shooting (Japanese Patent Application Laid-Open No. 11-308488).

In an imaging apparatus that includes a function of simultaneously shooting a still image during moving image shooting, it is required to grasp precisely a degree of focusing of each of a moving image and a still image by a simple operation.

In an imaging apparatus discussed in Japanese Patent Application Laid-Open No. 2007-96753, Japanese Patent Application Laid-Open No. 9-222664 and Japanese Patent Application Laid-Open No. 11-308488, an improvement is made with respect to a focus assist function and a display method at the time of simultaneously shooting a moving image and a still image. However, the improvement is limited to control concerning a peaking display method and display of a shooting mode in a single operation mode at the time of a still image shooting mode and a moving image shooting mode.

Thus, in an imaging apparatus discussed in Japanese Patent Application Laid-Open No. 2007-96753, Japanese Patent Application Laid-Open No. 9-222664 and Japanese Patent Application Laid-Open No. 11-308488, a degree of focusing corresponding to each of a moving image and a still image at the time of simultaneous shooting of a still image during moving image shooting is not referred to. Therefore, it is difficult to grasp precisely the degree of focusing of each of a moving image and a still image by a simple operation.

SUMMARY OF THE INVENTION

An embodiment of the present invention is directed to an imaging apparatus which can easily grasp an in-focus state and also precisely indicate the still image shooting when a still image is shot during moving image shooting, and a control method for controlling the imaging apparatus.

According to an aspect of the present invention, an imaging apparatus provided with a function of shooting a moving image and a still image, and capable of displaying an image to be captured on a display unit includes a first display control unit configured to display a confirmation image for checking an in-focus state on the display unit when a moving image is shot; and a second display control unit configured to change the confirmation image for checking an in-focus state displayed on the display unit by the first display control unit when a still image is shot during moving image shooting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A to 2E are schematic image views illustrating an object to be displayed on a liquid crystal display unit or a finder display unit, a focus frame and peaking display in a representative shooting mode of a digital video camera.

FIGS. 4A to 4E are schematic image views illustrating an object to be displayed on a liquid crystal display unit or a finder display unit, a focus frame and peaking display in a representative shooting mode of a digital video camera as an imaging apparatus according to a second exemplary embodiment of the present invention.

FIG. 5 is a diagram illustrating a method for identifying an in-focus state of still image shooting during moving image shooting.

DETAILED DESCRIPTION OF THE EMBODIMENTS

Various exemplary embodiments, features, and aspects of the invention will be described in detail below with reference to the drawings.

Figure 1:
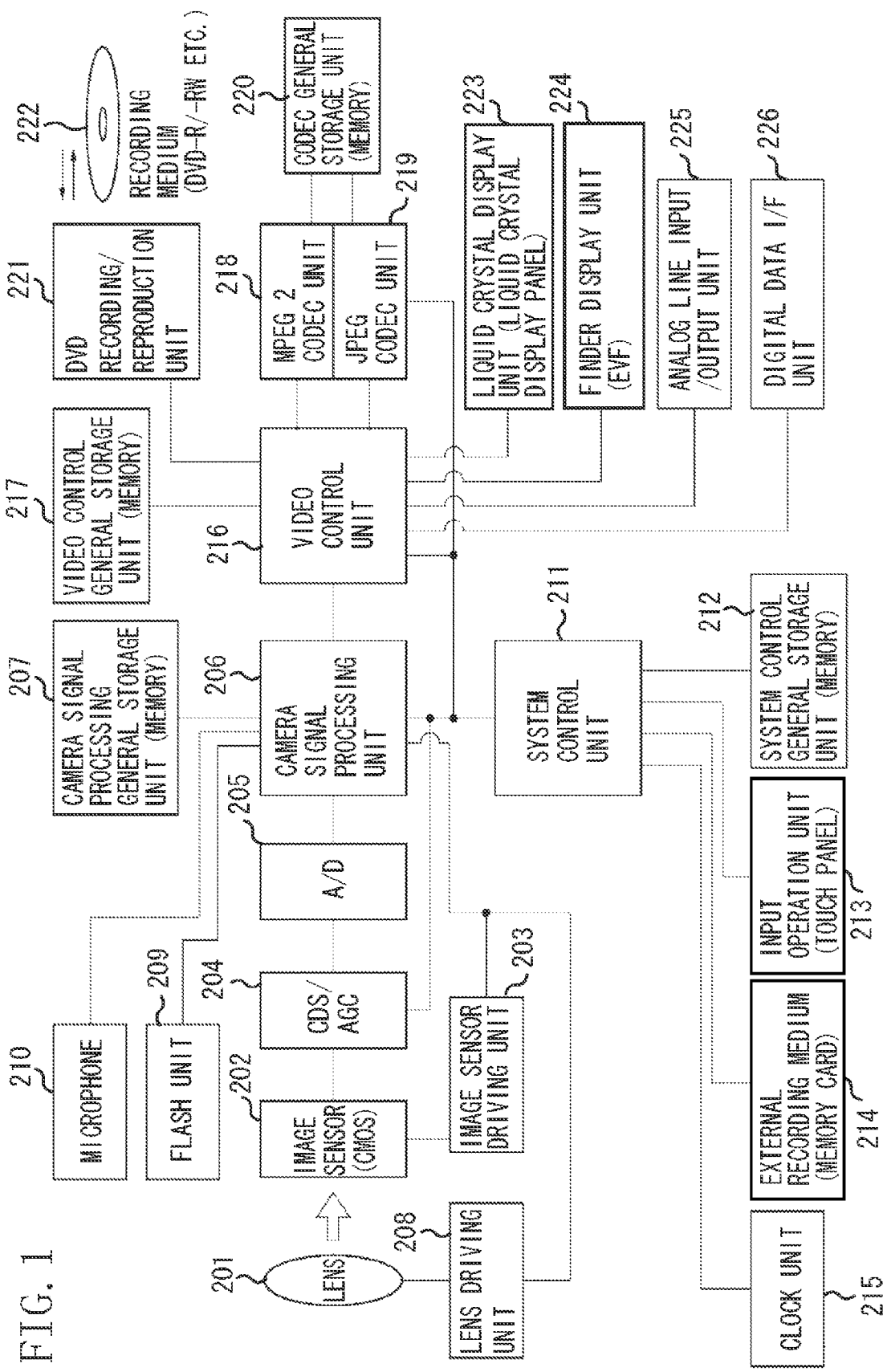
FIG. 1 is a block diagram illustrating a configuration of a digital video camera as an imaging apparatus according to a first exemplary embodiment of the present invention.

FIG. 1 is a schematic block diagram illustrating a digital video camera as an imaging apparatus according to a first exemplary embodiment of the present invention.

In FIG. 1, a lens unit 201 includes a zoom function for imaging an object (not shown), a focus (focusing) adjustment function, and an exposure diaphragm adjustment function. A complementary metal oxide semiconductor (CMOS) sensor 202 is an image sensor for capturing an image incident on the lens unit 201 and includes an electronic shutter function for still image shooting.

An image sensor driving unit 203 executes driving control of the CMOS sensor 202 according to timing from a camera signal processing unit 206. A correlated double sampling (CDS)/auto gain controller (AGC) 204 samples an analog signal from the CMOS sensor 202, removes an unnecessary noise, and also executes gain control of a signal level under control of a system control unit 211.

An analog/digital (A/D) converter 205 converts an analog signal output from the CDS/AGC 204 into a digital signal. The camera signal processing unit 206 performs control of a camera imaging system such as timing generation, automatic exposure (AE) control, gamma adjustment and AF control in conjunction with a system control unit 211. Further, the camera signal processing unit 206 can calculate a distance to an object in addition to an AF function and also calculates "AF evaluation value" which is the basis for control of a degree of focusing.

In the present exemplary embodiment, nine AF focusing frames are present on a screen in a screen lattice pattern. It is possible to select and use all focusing frames, or only focusing frames at the center part or the like. A plurality of focusing frames is collectively referred to as "focusing area".

A camera signal processing general-purpose storage unit 207 is used for a signal processing frame memory of a camera image. A lens driving unit 208 drives the lens unit 201 and executes zoom magnification and focus adjustment, and exposure adjustment.

At the time of AF, the camera signal processing unit 206 detects focus adjustment information (evaluation value). The lens driving unit 208 is driven by a control signal from the system control unit 211 based on the detected information to control the focus adjustment lens of the lens unit 201, so that focus adjustment is executed.

Further, at the time of MF, a user adjusts a focus ring, which belongs to an input operation unit 213 and is typically provided on the outer circumference of a lens. In this case, if an electronic mechanism is employed, the system control unit 211 detects the direction of rotation and the amount of rotation of a focus ring. The lens driving unit 208 is driven based on the detected information to control the lens unit 201, and thus focus adjustment is executed. If a mechanical mechanism is employed, since a focus ring is mechanically connected to the lens unit 201, the lens unit 201 is mechanically moved by a user rotating a focus ring, and thus focus adjustment is executed.

On the other hand, at the time of manual exposure adjustment, a user adjusts an iris dial, which belongs to the input operation unit 213 and typically is separately provided. More specifically, the system control unit 211 detects the direction of rotation and the amount of rotation of an iris dial, drives an exposure adjustment mechanism provided in the lens driving unit 208 based on the detected information to control a rhomboidal diaphragm provided in the lens unit 201, and thus exposure adjustment is executed.

A flash unit 209 is associated with exposure control and emits light as necessary, thereby compensating for the quantity of light of an object. With respect to emission of light of a flash unit, it is possible to select forced light emission, prohibition of light emission or an auto mode according to the result of photometry, by operation of an operator from the input operation unit 213. A microphone 210 collects a sound to record a surrounding sound while an image is incident on an optical system of the lens unit 201.

A system control unit 211 executes control over a digital video camera. A general-purpose storage unit 212 for system control includes a storage area where a control program, data and the like are stored. The general-purpose storage unit 212 is a generic term for a read only memory (ROM) and a random access memory (RAM), which are also used as an operation area as required in order to execute control.

The input operation unit 213 includes various kinds of operation keys and a touch panel. The input operation unit 213 includes, for example, a shooting start and stop button, a selection button and a determination button with various kinds of functions such as a zebra pattern and peaking display, a still image shooting shutter button, a focus ring, a zoom switch, and an iris dial.

In the present exemplary embodiment, an external recording medium 214 is a memory card (including memory card slot). Normally, during still image shooting, a joint photographic experts group (JPEG) file is stored in this memory card. A connection interface function for the external recording medium 214 is contained in the system control unit 211. A clock unit 215 includes a real time clock (RTC) and a backup battery. The clock unit 215 counts the date and time, and returns information about the date and time in response to the requirement from the system control unit 211.

A video control unit 216 executes display control of a liquid crystal display unit 223 and a finder display unit (EVF) 224, input/output control of an analog line input/output unit 225, control of output to a digital data I/F unit 226, and control of a digital video disc (DVD) recording/reproduction unit 221. Further, the video control unit 216 executes generation and superimposition of a zebra pattern and a peaking signal. A general-purpose storage unit 217 for video signal is used for a frame memory, a work memory and the like for signal processing relating to a video base band signal.

A moving picture experts group 2 (MPEG2) codec unit 218 executes coding/combining processing of a moving image. Instead of MPEG2, a H.264 codec may also be employed. A JPEG codec unit 219 executes coding/combining processing of a still image. A general-purpose storage unit 220 for codec is an operation memory necessary in coding/combining the MPEG codec unit 218 and the JPEG codec unit 219.

The DVD recording/reproduction unit 221 records/reproduces in a recording medium 222 the recording data that is coded/combined by the video control unit 216 and the MPEG codec unit 218 or the JPEG codec unit 219 and processed as a recording format.

In the present exemplary embodiment, the recording medium 222 is an optical disk such as a digital video disc-recordable (DVD-R) and a digital video disc-rewritable (DVD-RW). The DVD recording//reproduction unit 221 writes and reads moving image data, still image data and the like on and from the recording medium 222.

The liquid crystal display unit 223 and the finder display unit (EVF) 224 display an input image from an imaging system when the data is recorded by the DVD recording//reproduction unit 221, and together with the input image also display focus frame display, a zebra pattern, peaking display and the like according to operation of an operator. Further, the liquid crystal display unit 223 and the finder display unit (EVF) 224 display an image recorded in the recording medium 222 when data is reproduced by the DVD recording/reproduction unit 221. Furthermore, the liquid crystal display unit 223 and the finder display unit (EVF) 224 can also display operation information from the input operation unit 213 input by a user and any image information in the external recording medium 214.

An analog line input/output unit 225 is an interface group such as output of an analog component image, output of an S terminal, input/output of a composite image or the like. The analog line input/output unit 225 is connected to an external TV monitor or the like to display image output from a digital video camera on a TV screen in the case of output, and to receive input from an external imaging device in the case of input. The digital data I/F unit 226 is a universal serial bus (USB) I/F, an Institute of Electrical and an Electronics Engineers (IEEE) 1394 I/F, and a high-definition multimedia interface (HMDI).

FIGS. 2A to 2E are schematic image views illustrating an object to be displayed on the liquid crystal display unit 223 or the finder display unit 224, a focus frame and peaking display (identification image) in a representative shooting mode of a digital video camera of the above-described configuration.

FIG. 2A is a view illustrating live view display at the time of shooting in a "still image shooting" mode. Herein, a main object 102 is an upper body of a person. FIG. 2B is a view changed from a state of FIG. 2A at the time of a still image shooting mode, illustrating a display example when a shutter button included in the input operation unit 213 is half-pressed. In FIG. 2B, a focus frame 103 is displayed in a focused position (face of person in FIG. 2B).

FIG. 2C is a view illustrating a display example during moving image shooting in a normal AF mode at the time of "peaking display being turned off during moving image shooting" mode. FIG. 2D is a view illustrating a display example during moving image shooting in an MF mode at the time of "peaking display being turned on during moving image shooting" mode.

In FIG. 2D, peaking display 104 is shown with an emphasized edge at the contour part of the object 102. The peaking display 104 is shown with white and black in FIG. 2D. However, color of the peaking display 104 is optional. In FIG. 2D, the peaking display 104 is shown in a pre-set white color.

FIG. 2E is a view changed from a state of FIG. 2C or FIG. 2D, illustrating a display example when a shutter button included in the input operation unit 213 is half-pressed in a case where "simultaneous shooting of a still image is executed during moving image shooting".

In FIG. 2E, peaking display 105 is displayed with an emphasized edge at the contour part of the object 102. However, the peaking display 105 is different in a display color from the peaking display 104 illustrated in FIG. 2D. In FIG. 2E, the peaking display 105 is in a pre-set red color.

In viewing a change from FIG. 2C to FIG. 2E, the peaking display 105 is executed when a still image shooting shutter button is half-pressed during moving image shooting unlike the display in a still image shooting mode in FIG. 2B, in which the focus frame 103 is displayed. Thus, a degree of focusing to an object can be checked even when a still image is shot during moving image shooting. In addition, a photographer can precisely recognize that it is still image shooting during moving image shooting.

On the other hand, in viewing a change from FIG. 2D to FIG. 2E, a color is changed between the peaking display 104 as a focus assist function to a moving image during moving image shooting, and the peaking display 105 when a still image shooting shutter button is half-pressed. Thus, a photographer can precisely recognize that it is still image shooting during moving image shooting.

In the present exemplary embodiment, it is assumed that a shutter button is half-pressed. However, the embodiment is not limited to a half-pressed state, and the shutter button may be full-pressed. Several control methods in this case are possible. However, in the present exemplary embodiment, the same display as the case in which a shutter button is half-pressed is concurrently shown when still image shooting is executed in an optional time, and thus visibility and convenience of a photographer is enhanced.

Figure 3:
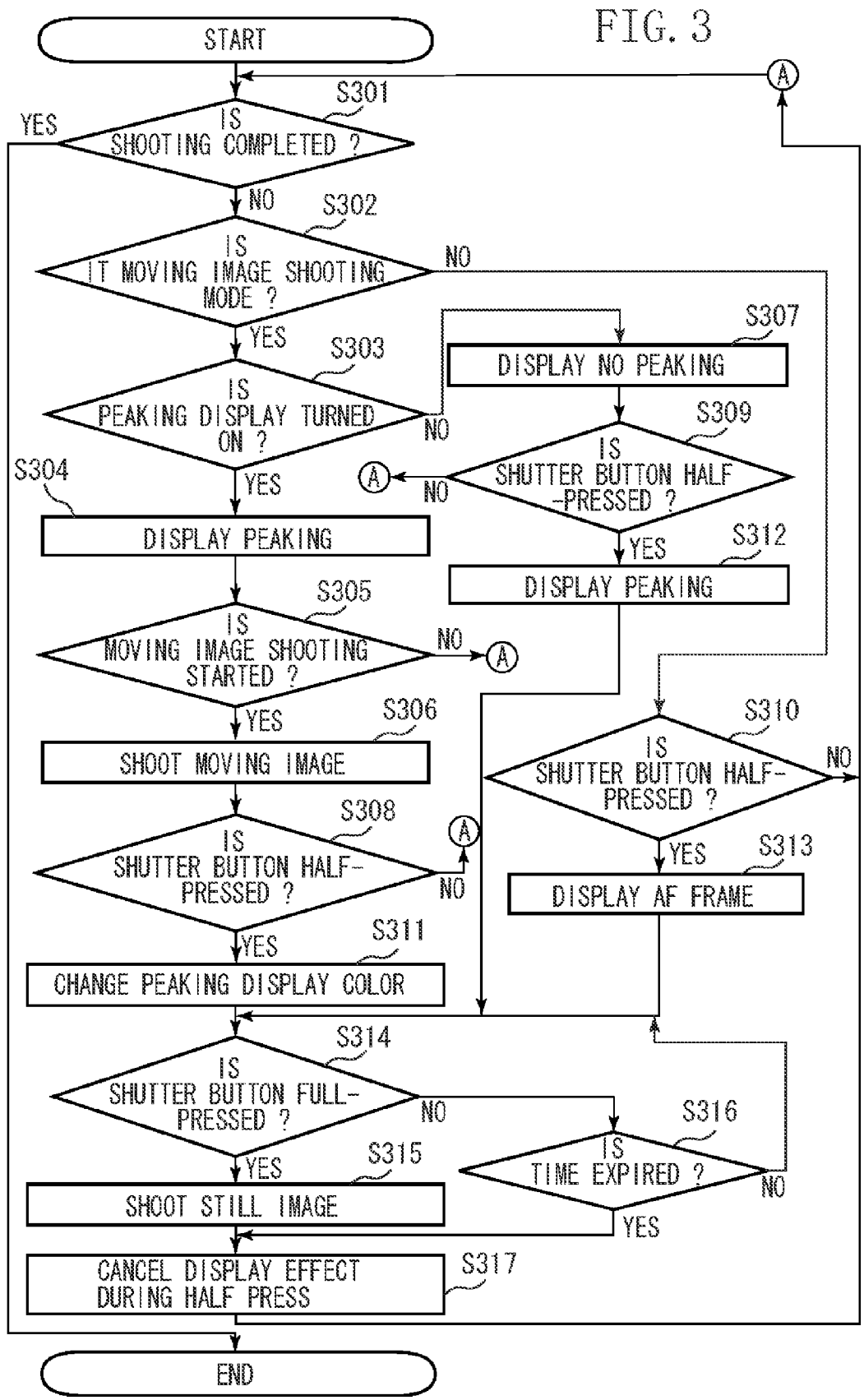
FIG. 3 is a flowchart illustrating an operation example of a digital video camera.

Next, referring to FIG. 3, an operation example of a digital video camera with the above-described configuration will be described. A control program stored in a ROM or a hard disk is loaded into a RAM and each processing in FIG. 3 is executed by a central processing unit (CPU) in the system control unit 211.

First, in step S301, the system control unit 211 determines whether a shooting mode is completed. More specifically, when the system control unit 211 is instructed to end a shooting mode by a photographer's operation via a mode dial of the input operation unit 213 (YES in step S301), the processing ends to terminate a shooting mode. If the termination of the shooting mode is not instructed (NO in step S301), the processing proceeds to step S302.

In step S302, the system control unit 211 determines whether a shooting mode is a moving image shooting mode or a still image shooting mode. If it is a moving image shooting mode (YES in step S302), the processing proceeds to step S303. If it is a (single) still image shooting mode (NO in step S302), the processing proceeds to step S310.

In step S303, the system control unit 211 executes determination of ON/OFF control of peaking display. More specifically, the system control unit 211 detects an operation of a peaking display ON/OFF button by a photographer in the input operation unit 213. If peaking display is set to ON (YES in step S303), the processing proceeds to step S304 to display peaking. If peaking display is set to OFF (NO in step S303), the processing proceeds to step S307.

In step S304, the system control unit 211 controls the video control unit 216 to start executing the peaking display to an object image, which is displayed on the liquid crystal display unit 223 or the finder display unit 224.

In step S305, the system control unit 211 determines whether moving image shooting is started. More specifically, the system control unit 211 determines whether a recording start/end button in the input operation unit 213 is operated by a photographer. If the operation is performed (YES in step S305), the processing proceeds to step S306 to start recording of moving image shooting. If the operation is not executed (NO in step S305), the processing returns to step S301.

In step S306, the system control unit 211 controls the DVD recording/reproduction unit 221 to record shot moving image data in the recording medium 222. Then, the processing proceeds to step S308.

In step S308, the system control unit 211 determines whether a still image recording shutter button in the input operation unit 213 is half-pressed by a photographer. If the still image recording shutter button is half-pressed (YES in step S308), the processing proceeds to step S311. If the still image recording shutter button is not half-pressed (NO in step S308), the processing returns to step S301.

In step S311, the system control unit 211 changes a display color of peaking display to be displayed on the liquid crystal display unit 223 or the finder display unit 224 in step S304, to a preset different color. Then, the processing proceeds to step S314.

On the other hand, when peaking display is set to OFF in step S303 (NO in step S303), in step S307, the system control unit 211 ends peaking display if peaking display is continued until then. Further, the system control unit 211 maintains a state as it is if peaking display is not executed. Then, the processing proceeds to step S309.

In step S309, the system control unit 211 determines whether a still image recording shutter button in the input operation unit 213 is half-pressed by a photographer. If the system control unit 211 detects that a still image recording shutter button is half-pressed (YES in step S309), the processing proceeds to step S312. If it is not detected (NO in step S309), the processing returns to step S301.

In step S312, the system control unit 211 controls the video control unit 216 to start executing peaking display (the same color as that in step S311) to an object image, which is displayed on the liquid crystal display unit 223 or the finder display unit 224. Then, the processing proceeds to step S314.

Further, in step S302, when it is determined to be a (single) still image shooting mode (NO in step S302), the processing in the system control unit 211 proceeds to step S310. In step S310, the system control unit 211 determines whether a still image recording shutter button in the input operation unit 213 is half-pressed by a photographer. If the system control unit 211 detects that a still image recording shutter button is half-pressed (YES in step S310), the processing proceeds to step S313. If it is not detected (NO in step S310), the processing returns to step S301.

In step S313, the system control unit 211 controls the video control unit 216 to display a focus frame on an in-focused part of an object image, which is displayed on the liquid crystal display unit 223 or the finder display unit 224. Then, the processing proceeds to step S314.

In step S314, the system control unit 211 determines whether a still image recording shutter button in the input operation unit 213 is full-pressed by a photographer. If the system control unit 211 detects that a still image recording shutter button is full-pressed (YES in step S314), the processing proceeds to step S315. If the shutter button is not full-pressed (NO in step S314), the processing proceeds to step S316.

In step S315, the system control unit 211 executes still image shooting in response to shutter full press in step S314. Then, the processing proceeds to step S317. In this step, the system control unit 211 executes control of various kinds of image processing, then controls the JPEG codec unit 219 code shooting data into a JPEG, and records the coded data into the memory card 214 (i.e., an external recording medium).

In step S316, the system control unit 211 executes time-out detection via the clock unit 215. If the shutter button is not full-pressed within a preset optional time (YES in step S316), the processing proceeds to step S317.

In step S317, the system control unit 211 resets a display effect performed in steps S311, S312 and S313. Then, the processing returns to step S301.

As described above, in the present exemplary embodiment, in a single mode of still image shooting, the system control unit 211 displays a focus frame representing an in-focus state in AF operation. In a still image shooting mode during moving image shooting, when a shutter button is half-pressed, the system control unit 211 executes peaking display of a color different from that executed at the time of moving image shooting. Thus, when a still image is shot during moving image shooting, the photographer can easily check an in-focus state in the liquid crystal display unit 223 or the finder display unit 224, and precisely recognize still image shooting.

Next, referring to FIGS. 4A to 4E to FIG. 6, a digital camera as an imaging apparatus according to a second exemplary embodiment of the present invention will be described. A hardware configuration of a digital video camera in the present exemplary embodiment is similar to the first exemplary embodiment (FIG. 1). Thus, same reference numerals as the first exemplary embodiment are used and its description will be omitted.

The present exemplary embodiment is different from the first exemplary embodiment in that a display color of peaking display is changed based on the evaluation value of an AF function which is a basis in detecting an in-focus state.

FIGS. 4A to 4E are schematic image views illustrating a shooting object, a focus frame and peaking display, which are displayed on the liquid crystal display unit 223 or the finder display unit 224, in a representative shooting mode of a digital video camera according to the present exemplary embodiment. Contents of FIGS. 4A to 4D are the same as those in already described FIGS. 2A to 2D. Thus, a description will be omitted.

In FIG. 4E, "simultaneous shooting of a still image is executed during moving image shooting". FIG. 4E is a view illustrating a display example when a shutter button in the input operation unit 213 in FIG. 4C or FIG. 4D is half-pressed.

In FIG. 4E, peaking display 401 is executed with an emphasized edge at the contour part of the object 102 (face portion in FIG. 4E). This peaking display 401 corresponds to a position of a focus area frame 402 and is controlled to execute edge-emphasizing display only to the vicinity of the focused focus area frame 402.

The focus area frame 402 indicates an area which is most focused. However, in actual display, this focus area frame 402 is not displayed and only the peaking display 401 is executed.

Here, when viewing a change from FIG. 4C to FIG. 4E, it is different from display in a still image shooting mode in FIG. 4B, in which the focus frame 103 is displayed. More specifically, when a still image shooting shutter button is half-pressed during moving image shooting, only peaking display 401 in the vicinity of a focus area is executed, which enables the photographer to find which part of an object is most focused. Simultaneously, a status of still image shooting during moving image shooting is clearly indicated to the photographer.

On the other hand, when viewing a change from FIG. 4D to FIG. 4E, the peaking display 104 as a focus assist function for a moving image during moving image shooting is different from the peaking display 401 when a still image shooting shutter button is half-pressed. Control in FIGS. 4D to 4E corresponds to step S311 in FIG. 3. In the present exemplary embodiment, a peaking display color is not changed as in the first exemplary embodiment, but a display state of the peaking display 401 is partially changed. This clearly indicates to the photographer that it is still image shooting during moving image shooting.

A method will be described in which control shown in FIG. 5 is added to the control which partially changes peaking display to check an in-focus state of still image shooting during moving image shooting.

In FIG. 5, peaking display 501 is executed with an emphasized edge at a contour of a part of the object 102 (part of face in FIG. 5) similar to the peaking display 401 in FIG. 4E. This peaking display 501 corresponds to a position of a focus area 502 and is controlled to execute edge-emphasizing display only to the vicinity of a focused focus area.

In FIG. 5, a display color of peaking display is changed between when an in-focus state is displaced from a peak thereof and when an in-focus state is fine, in synchronization with in-focus information in the focus area 502. A threshold for an AF evaluation value indicating an in-focus state can optionally be set beforehand. Further, a display color of the peaking display 501 when an in-focus state is displaced from a peak thereof is "orange".

The focus area 502 indicates an area which is most focused similar to the focus area 402 in FIG. 4E. In actual display, this focus area 502 is not displayed and only the peaking display 501 is executed.

The peaking display 503 is displayed with an emphasized edge at a contour of a part of the object 102 (part of face in FIG. 5). This peaking display 503 corresponds to a position of a focus area 504 and is controlled to execute edge-emphasizing display only to the vicinity of a focused focus area. Further, this peaking display 503 represents an example when an in-focus state is finer than that of in-focus information in the focus area 502. The peaking display 503 is displayed by changing a display color from the peaking display 501, and its display color is "green".

The focus area 504 indicates an area which is most focused similar to the focus area 502. In actual display, this focus area 504 is not displayed and only the peaking display 503 is executed.

Figure 6:
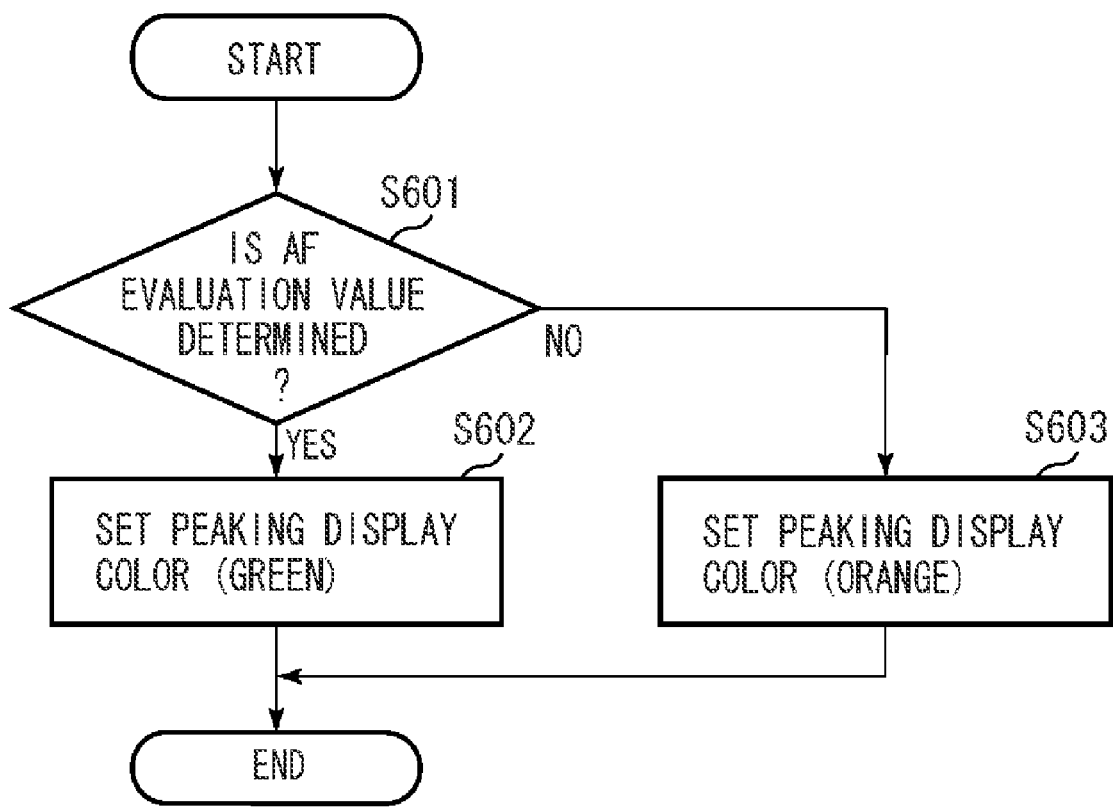
FIG. 6 is a flowchart illustrating control of a color change of peaking display corresponding to an AF evaluation value.

Next, referring to FIG. 6, control for changing a color of peaking display according to an AF evaluation value will be described. Each processing in FIG. 6 corresponds to step S117 or step S312 in FIG. 3, and is executed by the system control unit 211 similar to FIG. 3.

In step S601, the system control unit 211 determines whether a present AF evaluation value in the camera signal processing unit 206 is a value on a focused side or a value on a defocused side relative to a preset threshold value. When an AF evaluation value (detected value) is on the focused side (YES in step S601), the processing proceeds to step S602. When an AF evaluation value is on the defocused side (NO in step S601), the processing proceeds to step S603.

In step S602, the system control unit 211 sets a display color of peaking display to "green" which is a preset color and ends the processing. Then, the processing proceeds to step S314 in FIG. 3.

In step S603, the system control unit 211 sets a display color of peaking display to "orange" which is a preset color and ends the processing. Then, the processing proceeds to step S314 in FIG. 3.

As described above, in the present exemplary embodiment, a display color of peaking display is changed corresponding to an AF evaluation value as an indication of a shutter chance for focused shooting even when a degree of focusing cannot be adjusted for still image shooting while the moving image shooting is in progress. Other configurations and effects of action are similar to the first exemplary embodiment.

Further, the present invention is accomplished by performing the following processing. A computer-readable storage medium recording a program code of software which realizes a function of the above-described exemplary embodiment is supplied to a system or an apparatus, and causes a computer (or CPU, microprocessor unit (MPU) or the like) of its system or apparatus to read a program code stored in a computer-readable storage medium.

In this case, a program code itself read from a storage medium realizes a function of the above-described exemplary embodiments. Thus, the present invention includes its program code and a computer-readable storage medium storing the program code.

The storage medium for supplying a program code is, for example, a floppy disk, a hard disk, a magneto-optical disk, a CD-ROM, a CD-R, a CD-RW, a DVD-ROM, a DVD-RAM, a DVD-RW, DVD+RW, a magnetic tape, a nonvolatile memory card, a ROM and the like. Also, a program code may be downloaded via a network.

Further, the present invention also includes the case in which a program code read by a computer is executed, thereby realizing a function of the above-described exemplary embodiments. In addition to this, the present invention also includes the case in which an operation system (OS) or the like running on a computer executes a part or the whole of actual processing based on a command of its program code to realize a function of the above-described exemplary embodiments by its processing.

Further, the present invention also includes the case in which a function of the above-described exemplary embodiments is realized by the following processing. A program code read from a computer-readable storage medium is written in a memory included in a function extension board inserted into a computer or a function extension unit connected to a computer. A CPU or the like included in its function extension board or the function extension unit executes a part or the whole of actual processing based on a command of its program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-062765 filed Mar. 12, 2008, which is hereby incorporated by reference herein in its entirety.

What is claimed is:

1. An imaging apparatus including a function of shooting a still image in movie image shooting mode, and capable of displaying an image to be captured on a display unit, the imaging apparatus comprising:
   a first display control unit configured to display a confirmation image for checking an in-focus state on the display unit when a moving image is shot in the movie image shooting mode, wherein the confirmation image defines a first contour of an entire object within the moving image; and
   a second display control unit configured to change the confirmation image for checking an in-focus state displayed on the display unit by the first display control unit when a still image is shot in the moving image shooting mode, wherein the changed confirmation image defines a second contour of the object and the second contour defines an area that is smaller than an area defined by the first contour.

2. The imaging apparatus according to claim 1, wherein the second contour defines an area that is more focused than the first contour.

3. The imaging apparatus according to claim 1, wherein the second contour defines an area with a highest detected value of the in-focus state in the still image.

4. A method for controlling an imaging apparatus including a function of shooting a still image in movie image shooting mode, and capable of displaying an image to be captured on a display unit, the method comprising:
   displaying a confirmation image for checking an in-focus state on the display unit when a moving image is shot in the movie image shooting mode, wherein the confirmation image defines a first contour of an entire object within the moving image; and
   changing the confirmation image displayed on the display unit when a still image is shot in the moving image shooting mode, wherein the changed confirmation image defines a second contour of the object and the second contour defines an area that is smaller than an area defined by the first contour.

* * * * *